H. BENNETT.
TOW BAR FOR AUTOMOBILES.
APPLICATION FILED MAR. 3, 1921.
1,438,291.
Patented Dec. 12, 1922.
2 SHEETS—SHEET 1.
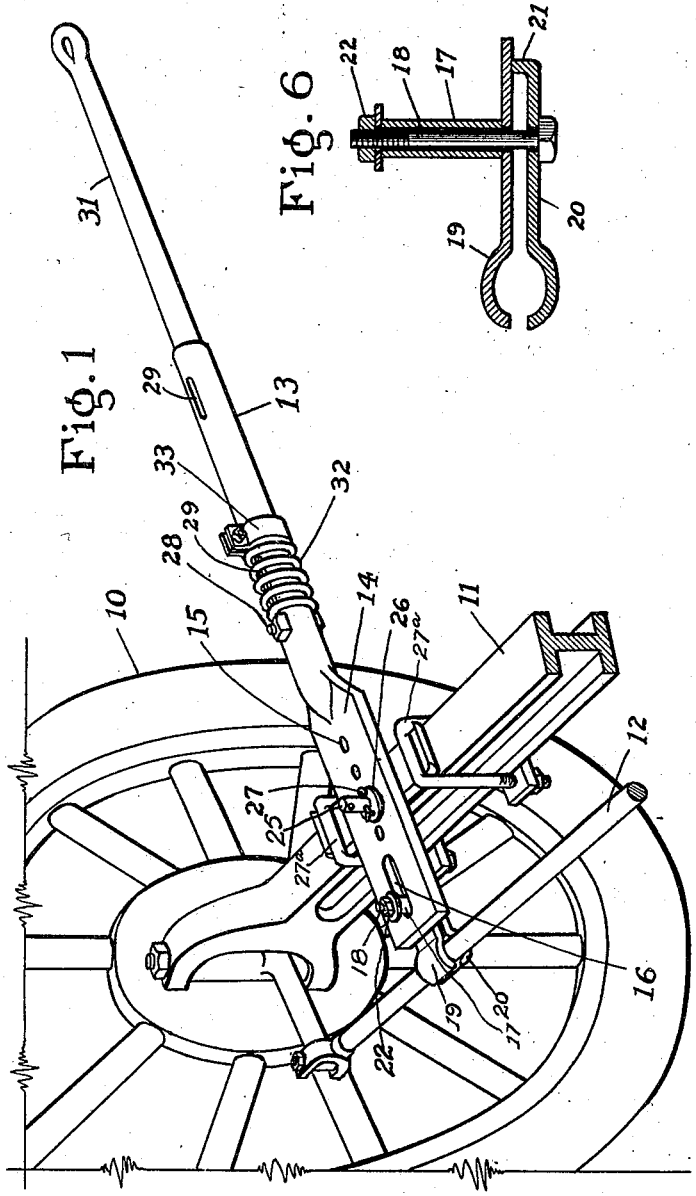
INVENTOR
*Harold Bennett*
BY *Edward E. Longan*
ATTORNEY

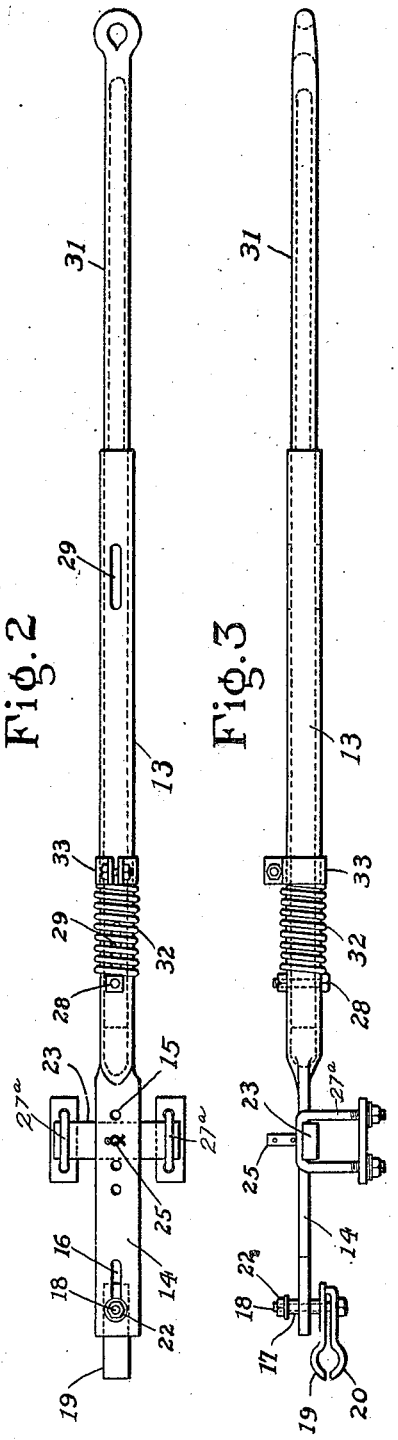

Patented Dec. 12, 1922.

1,438,291

UNITED STATES PATENT OFFICE.

HAROLD BENNETT, OF BRIDGETON, MISSOURI.

TOW BAR FOR AUTOMOBILES.

Application filed March 3, 1921. Serial No. 449,581.

*To all whom it may concern:*

Be it known that I, HAROLD BENNETT, a citizen of the United States, and resident of Bridgeton, county of St. Louis, and State of Missouri, have invented certain new and useful Improvements in Tow Bars for Automobiles, of which the following is a specification containing a full, clear, and exact description, reference being had to the accompanying drawings, forming a part hereof.

My invention relates to tow bars for automobiles, and has for its primary object the construction of a shock absorbing tow bar which may be applied to various makes of automobiles, trucks and the like, and by means of which the machine to which it is attached may be not only towed but steered or guided, thus eliminating the use of a special operator for the towed machine or truck.

In the drawings:

Fig. 1 is a perspective view with parts broken away and in section of an automobile, front axle and steering rod having my improvement applied thereto.

Fig. 2 is a top plan view of the same.

Fig. 3 is a side elevation.

Fig. 4 is a vertical longitudinal section of the rear member of my improvement.

Fig. 5 is a plan view of the forward member of my improvement.

Fig. 6 in a vertical sectional view of the clamp by means of which my improvement is attached to the steering rod.

Fig. 7 is a perspective of the plate or member applied to the axle and to which my improvement is attached.

Fig. 8 is a plan view of a modified form of my improvement.

Fig. 9 is a central longitudinal section of the same.

Referring to the drawings:

10 indicates an automobile wheel, 11 the front axle and 12 the steering rod which may be of any type or construction. The rear section of my improvement is indicated by the numeral 13, which in the preferred form consists of a pipe or tube flattened, as at 14. The flattened portion 14 is provided with a series of openings or holes 15 and with the slot 16, and mounted in the slot 16 is a sleeve 17 in which is located a screw-threaded bolt 18 and mounted on this bolt 18 are two clamping members 19 and 20, the clamping member 20 being provided with a flange 21. The clamping members 19 and 20 being adapted to embrace and grip the steering rod 12 by tightening the nut 22. The clamping device for the steering rod 12 is adjustable in the elongated slot 16 so as to fit machines wherein the steering rod is located at different distances from the front axle level. Mounted on the front axle 11 is a plate 23 having upturned ends 24 and with a central pin 25. The pin 25 is adapted to be inserted in the openings 15 and the rear member 13 of my device is held in position on the plate 23 by means of a washer 26 and cotter pin 27. The plate or member 23 is held in position on the front axle 11 by means of U-shaped clips 27ª. These may be of various sizes for front axles. Mounted in the member 13 is a bolt 28 which passes through the slot 29 formed in said member and through the opening 30 formed in the forward member 31. Mounted on the member 13 is a coil spring 32, the rear end of which is seated against the bolt 28 and the forward end of which against the band 33.

By the construction just described it is obvious there is a yielding connection between the members 13 and 31 so that when power is applied to the section 31 in towing the vehicle to which my improvement is applied, the vehicle may be towed without a jarring start and when the power applied to the member 31 is arrested the towed vehicle will stop without a jar; in other words, the connection just described acts as a yielding buffer for starting the towed vehicle and also arresting its motion.

It will be further observed that the sleeve 17 acts as a bearing on which the member or section 13 may turn.

In case it is desired to lengthen the tow bar an additional slot 29 is provided in the member 13. In the preferred form of my improvement, the member 13, as previously stated, is flattened at one end, as at 14, but if desired I might employ the modified form illustrated in Figs. 8 and 9. In employing the modified form the round end of the member illustrated in Figs. 8 and 9 may be inserted into the tubular member 13 and may be bolted therein and by means of bolts passing through the tubular member and through the round ends of the members illustrated in Figs. 8 and 9.

Having fully described my invention, what I claim is:

A tow bar composed of a tubular rear member provided with a series of openings, and a slot in the rear end, a front member located therein, a bolt, collar, and coil spring for yieldingly connecting said members, a plate provided with upturned ends and a pin adapted to be inserted in said openings, a pair of clips mounted on said plate for securing the same to the axle of a vehicle, a pair of clamping members adapted to engage the steering rod, a sleeve mounted on one of said members, and a bolt adapted to be inserted through said clamping members and sleeve, for securing the clamping members to a steering rod.

In testimony whereof I have signed my name to this specification.

HAROLD BENNETT.